United States Patent
Ho et al.

(10) Patent No.: US 10,521,636 B1
(45) Date of Patent: *Dec. 31, 2019

(54) APPARATUS AND METHOD TO DETERMINE A DISTANCE OF A VISUAL OBJECT USING A LABEL

(71) Applicants: Chi Fai Ho, Palo Alto, CA (US); Augustine Junda Ho, Palo Alto, CA (US)

(72) Inventors: Chi Fai Ho, Palo Alto, CA (US); Augustine Junda Ho, Palo Alto, CA (US)

( * ) Notice: Subject to any disclaimer, the term of this patent is extended or adjusted under 35 U.S.C. 154(b) by 131 days.

This patent is subject to a terminal disclaimer.

(21) Appl. No.: 15/884,033

(22) Filed: Jan. 30, 2018

Related U.S. Application Data

(63) Continuation of application No. 15/263,482, filed on Sep. 13, 2016, now Pat. No. 9,922,254.

(51) Int. Cl.
| | |
|---|---|
| *G06K 9/00* | (2006.01) |
| *G09G 3/30* | (2006.01) |
| *G06F 3/14* | (2006.01) |
| *G06T 5/00* | (2006.01) |
| *G06K 7/10* | (2006.01) |
| *G06T 3/60* | (2006.01) |

(52) U.S. Cl.
CPC ............... *G06K 9/00* (2013.01); *G06F 3/14* (2013.01); *G06K 7/10881* (2013.01); *G06T 3/60* (2013.01); *G06T 5/002* (2013.01)

(58) Field of Classification Search
USPC ........ 382/100, 103, 106, 108, 112, 135–140, 382/162, 168, 173, 180–188, 199, 209, 382/219, 232, 254, 276, 285–292, 305, 382/321, 164, 167; 345/85, 419, 81; 235/437

See application file for complete search history.

(56) References Cited

U.S. PATENT DOCUMENTS

| | | | |
|---|---|---|---|
| 8,983,188 B1 * | 3/2015 | Lang | G06T 5/002 382/167 |
| 2007/0024551 A1 * | 2/2007 | Gelbman | G06F 3/14 345/85 |
| 2013/0256409 A1 * | 10/2013 | Reed | G06K 7/10881 235/437 |
| 2014/0354629 A1 * | 12/2014 | Adlers | G06T 3/60 345/419 |
| 2016/0379080 A1 * | 12/2016 | Yalniz | G06K 9/4609 382/164 |

\* cited by examiner

*Primary Examiner* — Seyed H Azarian
(74) *Attorney, Agent, or Firm* — North Shore Patents, P.C.; Michele Liu Baillie

(57) ABSTRACT

In a method for determining a distance of an object captured by a camera coupled to a controller, a controller of a computing device receives an image of the object and a label associated with the object. The controller identifies a label image of the label in the image and determines a label dimension of the label, the label dimension includes a real world size of the label. The controller determines a label image dimension of the label image, the label image dimension comprising a size of the label image, and determines a set of optical characteristics of the camera. The controller calculates a label distance using the set of optical characteristics of the camera, the label dimension, and the label image dimension. The controller announces the label distance using at least one output component coupled to the controller.

26 Claims, 7 Drawing Sheets

APPARATUS AND METHOD TO DETERMINE A DISTANCE OF A VISUAL OBJECT USING A LABEL

BACKGROUND OF THE INVENTION

Field

This invention relates generally to an image sensor controller, and more specifically, to estimate a distance of a visible object captured by the image sensor.

Related Art

Optical cameras, either RGB cameras or night vision cameras, are of very good quality and can take excellent pictures. By mounting the cameras onto a head-mount unit or a glass frame, pictures of what human eyes can see may be taken. When human eyes see an object, the human brain can usually estimate how far away the object is. However, despite the captured images have good details, how far away an object is cannot be determined from the picture.

There are depth-sensing cameras that are capable of estimating a distance of an object. These depth-sensing cameras typically work within a small and limited distance range, and require high performance computing resources. They are not appropriate to be used in a highly mobile or wearable containing unit such as a helmet, a glass frame or a dress pin, where the container will get hot quickly when the depth-sensing cameras are being used. The distance range limitation also restricts the usefulness of these cameras to objects less than a few feet away.

In an environment where a user has visual constraints, due to dim light, or limited visibility, such as when the user is visually impaired or wearing a virtual reality head-mounted device (HMD), the user needs help to gauge distances of objects in the environment. The user may need to know where an exit door is and how far away it is. The user may want to pick up a cup of coffee on a table. The user may want to know if she has to get up to go get the box of cereals.

In a different scenario, a user may use a guided animal or a remote controlled vehicle or robot to examine the environment, such as a warehouse, a light-out factory floor, a data center, or a disaster area. A device with normal or limited computing resources equipped with a normal camera is desirable. The device must be able to tell the distance of an object away from the device so that the user can navigate the environment or guide the device or animal to navigate the environment.

The above scenarios illustrate the need to estimate a distance of a visible object and to announce the object based on the distance.

BRIEF SUMMARY OF THE INVENTION

Disclosed herein is a method for determining a distance of an object captured by a camera, and a corresponding system and a computer program product as specified in the independent claims. Embodiments of the present invention are given in the dependent claims. Embodiments of the present invention can be freely combined with each other if they are not mutually exclusive.

According to one embodiment of the present invention, in a method for determining a distance of an object captured by a camera, a controller of a computing device: (a) receives an image of the object and a label associated with the object, the image captured by the camera coupled to the controller; (b) identifies a label image of the label in the image; (c) determines a label dimension of the label, the label dimension comprising a real world size of the label; (d) determines a label image dimension of the label image, the label image dimension comprising a size of the label image; (e) determines a set of optical characteristics of the camera; (f) calculates a label distance using the set of optical characteristics of the camera, the label dimension, and the label image dimension; and (g) announces the label distance using at least one output component coupled to the controller.

In one aspect of the present invention, the label image comprises a label code, wherein the label code comprises the label dimension, and the controller extracts the label dimension from the label code.

In one aspect of the present invention, the label image comprises a label code, and the controller queries a network device to obtain the label dimension using the label code.

In one aspect of the present invention, in determining the label image dimension of the label image, the controller determines the label image dimension using a unit of length or a unit of width of the label image and the label dimension.

In one aspect of the present invention, the set of optical characteristics of the camera comprises a distance index, the distance index determined using an image dimension of the image, a focal length of a lens of the camera, and an image sensor dimension of an image sensor of the camera.

In one aspect of the present invention, the label distance indicates a distance of the label perpendicular to an image sensor of the camera, and the controller calculates the label distance using the set of optical characteristics of the camera, the label dimension, the label image dimension and a label location, wherein the label location comprises a location of the label in the label image.

In one aspect of the present invention, the label location includes an x-dimension value and a y-dimension value measured from a center of the image, wherein the label distance is calculating further using the x-dimension and the y-dimension values of the label location.

In one aspect of the present invention, the controller calculates an orientation for the label distance relative to a center of the image and announces the orientation for the label distance.

In one aspect of the present invention, the image further comprises an object image of the object. The controller further obtains object information associated with the object, determines an object distance using the label distance and an object location using the label location, and announces one or more of the following consisting of: the object distance; the object location; and the objection information.

In one aspect of the present invention, the controller displays an overlay image comprising the object information over the object image.

In one aspect of the present invention, the controller announces the label distance using a speaker.

DETAILED DESCRIPTION OF THE INVENTION

The following description is presented to enable one of ordinary skill in the art to make and use the present invention and is provided in the context of a patent application and its requirements. Various modifications to the embodiment will be readily apparent to those skilled in the art and the generic principles herein may be applied to other embodiments. Thus, the present invention is not intended to be limited to the embodiment shown but is to be accorded the widest scope consistent with the principles and features described herein.

Reference in this specification to "one embodiment", "an embodiment", "an exemplary embodiment", or "a preferred embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments. In general, features described in one embodiment might be suitable for use in other embodiments as would be apparent to those skilled in the art.

Figure 1:
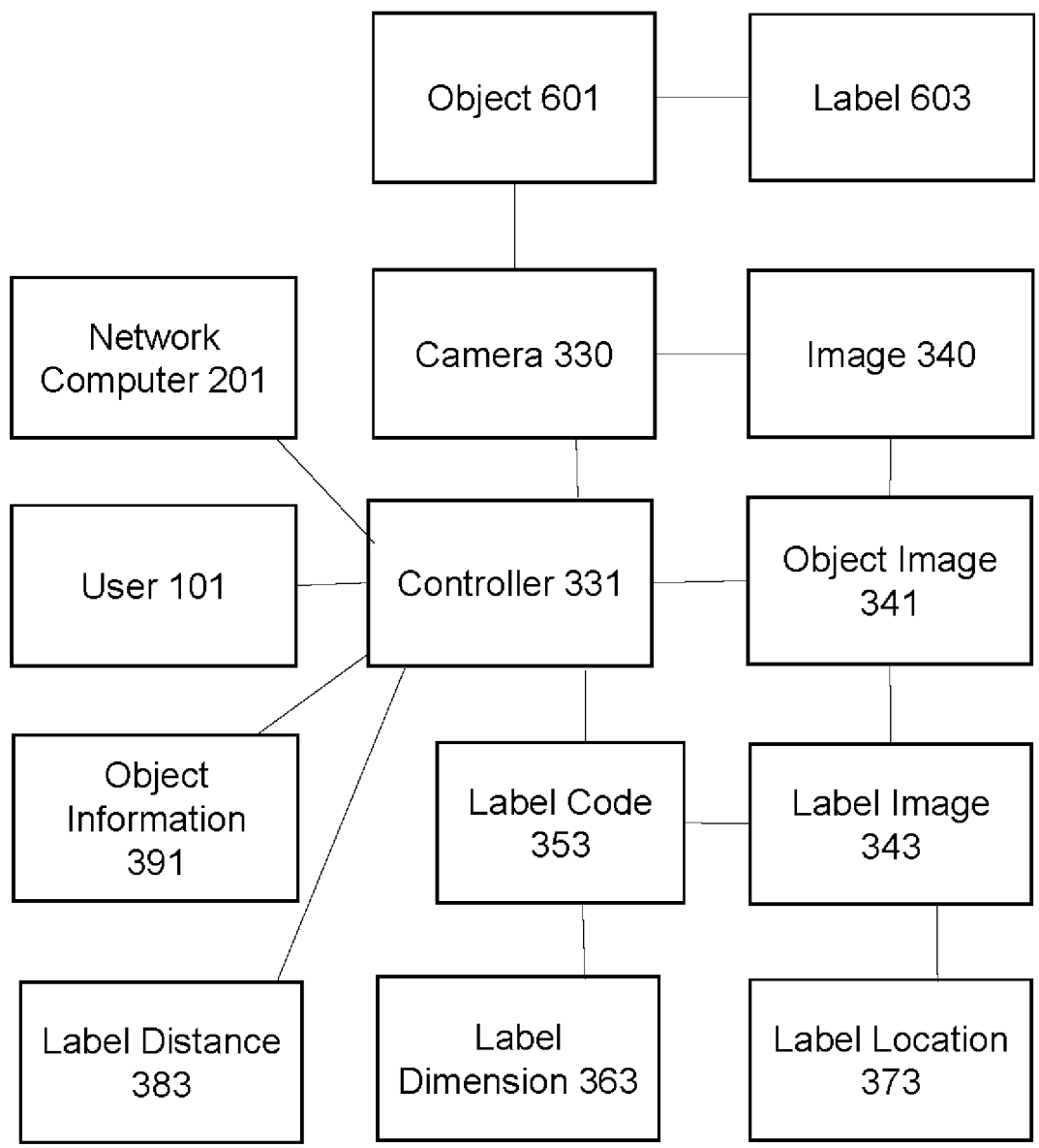
FIG. 1 illustrates an exemplary embodiment of a process to determine a distance of a visual object using an object label.

FIG. 1 illustrates an exemplary embodiment of a process to determine a distance of a visual object using an object label. In one embodiment, user 101 uses controller 331 to recognize object 601. In one embodiment, controller 331 includes or connects to a camera 330. In one embodiment, object 601 includes a label 603. In one embodiment, camera 330 captures an image 340, comprising object image 341 of object 601 and label image 343 of label 603. Controller 331 recognizes label 603 using label image 343, and determines label code 353 from recognized label image 343.

In one embodiment, object 601 is a physical object such as a coffee cup, a printed book, an electronic device, an appliance, an equipment, a stove, a coffee pot, a desk, a table, a cereal box, a loaf of bread, an everyday object typically found in a store, a restaurant, a resident, a building or any object typically used by user 101. In one embodiment, object 601 includes a brochure, a pamphlet, or a piece of text describing or representing a service. In one embodiment, object 601 includes label 603 which identifies object 601. Label 603 may include a bar code, a QR code, a 2-dimensional bar code, a 3-dimensional bar code, a pattern, a colored pattern, a black-and-white pattern, a colored blob, a sequence of one or more characters, a product code, a serial number, or a textual description, or an image recognizable by controller 331. In one embodiment, label 603 is printed on object 601. In one embodiment, label 603 includes a sticker glued onto object 601.

In one embodiment, label code 353 includes a label dimension 363 of label 603, indicating a real-world size of label 603. In one embodiment, label dimension 363 includes one or more of a length, a height, a width, a diagonal length of label 603. For example, label dimension 363 indicates a length of 1 inch, 18 inches, 1.2 cm, 200 cm or 20 mm, a dimension of 1-inch×0.75 inch, 15 inches×8 inches, 2 cm×1.5 cm, or a diagonal length of 5 inches or 40 inches. Controller 331 uses label code 353 to determine label dimension 363. In one embodiment, controller 331 uses label code 353 to obtain label dimension 363 by querying another computing device, such as a network computer 201 over a data network. In one embodiment, controller 331 obtains label dimension 363 through matching the label code 353 to a label dimension stored in a table in a storage module connected to controller 331. In one embodiment, label code 353 may include a serial number, a product code, product or service identity a bar code, a QR-code, a piece of text, a string of alpha numeric characters, a pixel pattern or a printed code, a serial number, or a part number. For example, label code 353 includes an alpha numeric string that includes "dimension: 2-inch-wide", "2 cm×2 cm", "1.2 cm×2.5 cm", "D:mm:3:4" to indicate the dimension is 3 mm×4 mm, or "diagonal 3 in" to indicate a diagonal dimension of 3 inches. In one embodiment, controller 331 uses label dimension 363 and one or more optical attributes of camera 330 to calculate a label distance 383, indicating a distance of label 603 away from camera 330 or the user 101. In one embodiment, controller 331 may also use label location 373 of label image 343 within image 340 to calculate label distance 383. In one embodiment, upon calculating label distance 383, controller 331 announces label distance 383 to user 101. In one embodiment, controller 331 treats label distance 383 as a distance of object 601 camera 330 and announces label distance 383 to user 101 as a distance of object 601. In one embodiment, label distance 383 is 5.5 feet, 45 cm, 127 cm, or 73.2 inches. In one embodiment, label distance 383 includes an orientation of object 601 relative to the camera 330, and controller 331 uses label location 373 and label distance 383 to determine the orientation of object 601 relative to the camera 330. For example, label distance 383 includes an orientation of "2 o'clock direction", "11 o'clock direction", "upper left", "slight right", "slight left ahead", "north east 22.5 degree", or other form of direction useful for user 101 or a computing application.

In one embodiment, controller 331 obtains object information 391 associated with object 601 using label code 353. In one embodiment, object information 391 includes a product description, a part description, a price, an inventory number, a store location, an availability indication, a user name, an owner information, a service record, a physical description such as dimension, weight, color, a list of ingredient, a usage instruction, a doctor name, usage information, installation guide, information related to a manufacturer, a supplier, a retailer, a warehouse, a manager, a department, shipment, or delivery tracking, or any useful information related to object 601. In one embodiment, object information 391 includes one or more of a document, a piece of text, an audio clip, a sound signal, a video clip, an animation, or a piece of computing instruction to be executed. In one embodiment, controller 331 obtains object information 391 from network computer 201, or from a storage module connected to controller 331. In one embodiment, controller 331 presents object information 391 to the user 101, optionally with label distance 383.

In one embodiment controller 331 includes a computing device housed in a smartphone, a head-mounted device (HMD), a glass frame, goggles, a binocular, a magnifying glass, a helmet, a pen, a dress pin, a headset, a wearable device, a watch, a belt, a mobile computing device, a portable device, or a device convenient for the user 101 to carry.

In one embodiment, camera 330 includes an optical camera, an infrared (IR) or near IR camera allowing image 340 to be captured in the dark, or an imaging sensor assisted by a lens. In one embodiment, camera 330 is housed together with controller 331 in a device such as a smartphone, a glass frame, goggles, a HMD, a dress pin, a pen or a portable chassis. In one embodiment, camera 330 is housed in a separate containing unit from the controller 330 and is connected to controller 330 over a wire, a connector, or a wireless network, allowing controller 331 to receive image 340 from camera 330. In one embodiment, camera 330 may be housed in a pen or a pin, while controller 331 is housed in a HMD, a pair of glasses, a helmet, a smartphone, a laptop, or a personal computer. In one embodiment, camera 330 may be housed in a second computing device separate from controller 331 and remotely controlled by the controller 331, such as a remote-controlled car, a drone, a small flying robot or object, a small robot, a HMD worn by a guide dog or a rescue dog, or an automobile. In this embodiment, controller 331 receives image 340 and other images captured by camera 330 through the second computing device over a data network or a wireless network.

In one embodiment, camera 330 is housed near a user's eyes so that the image 340 that is captured by the camera 330 reflects what is seen by user 101. In one embodiment, camera 330 is housed near a guide dog's eye, a robot's head, or a remote-controlled car's windshield such that that image 340 captured by the camera 330 provides a first-person view.

Figure 2:
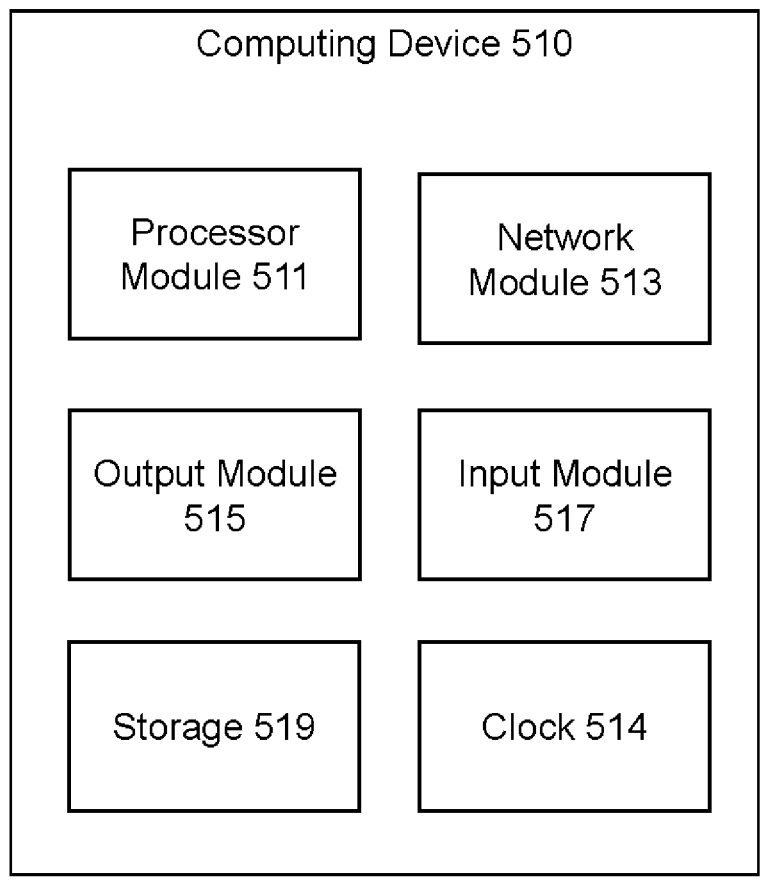
FIG. 2 illustrates an embodiment of a computing device.

FIG. 2 illustrates an exemplary embodiment of hardware components of a computing device which can be used for a controller or to house a controller. In one embodiment, computing device 510 includes a processor module 511, an output module 515, an input module 517, and a storage module 519. In one embodiment, computing device 510 may include a network module 513 or a clock 514. In one embodiment, processor module 511 includes one or more general processors, a multi-core processor, an application specific integrated circuit based processor, a system on a chip (SOC) processor or an embedded processor. In one embodiment, output module 515 includes or connects to a display for displaying video signals, images and text, and an audio speaker to play sound signals. In one embodiment, output module 515 includes a data interface such as USB, HDMI, DVI, DisplayPort, thunderbolt or a wire-cable connecting to a display or a speaker. In one embodiment, output module 515 connects to a display or a speaker using a wireless connection or a wireless data network. In one embodiment, input module 517 includes a physical or logical keyboard, buttons, keys, or microphones. In one embodiment, input module 517 includes or connects to one or more sensors such as a camera sensor, an optical sensor, a night-vision sensor, an infrared (IR) sensor, a motion sensor, a direction sensor, a proximity sensor, a gesture sensor, or other sensors that is usable by a user to provide input to computing device 510. In one embodiment, input module 517 includes a physical panel housing one or more sensors. In one embodiment, storage 519 includes a storage medium, a main memory, a hard disk drive (HDD), a solid state drive (SSD), a memory card, a ROM module, a RAM module, a USB disk, a storage compartment, a data storage component or other storage component. In one embodiment, network module 513 includes hardware and software to connect to a wireless data network such as a cellular network, a mobile network, a Bluetooth network, a NFC network, a personal area network (PAN), a WiFi network, or a LiFi network. Storage 519 includes executable instructions when read and executed by the processor module 511 of computing device 510 implement one or more functionality of the current invention.

In one embodiment computing device 510 includes a clock 514, which provides date and time information to computing device 510.

In one embodiment, computing device 510 does not include all the modules. In one embodiment, computing device 510 does not have network module 513 or clock 514.

Returning to FIG. 1, controller 331 includes computing device 510 housed in a physical container as described previously.

Figure 3:
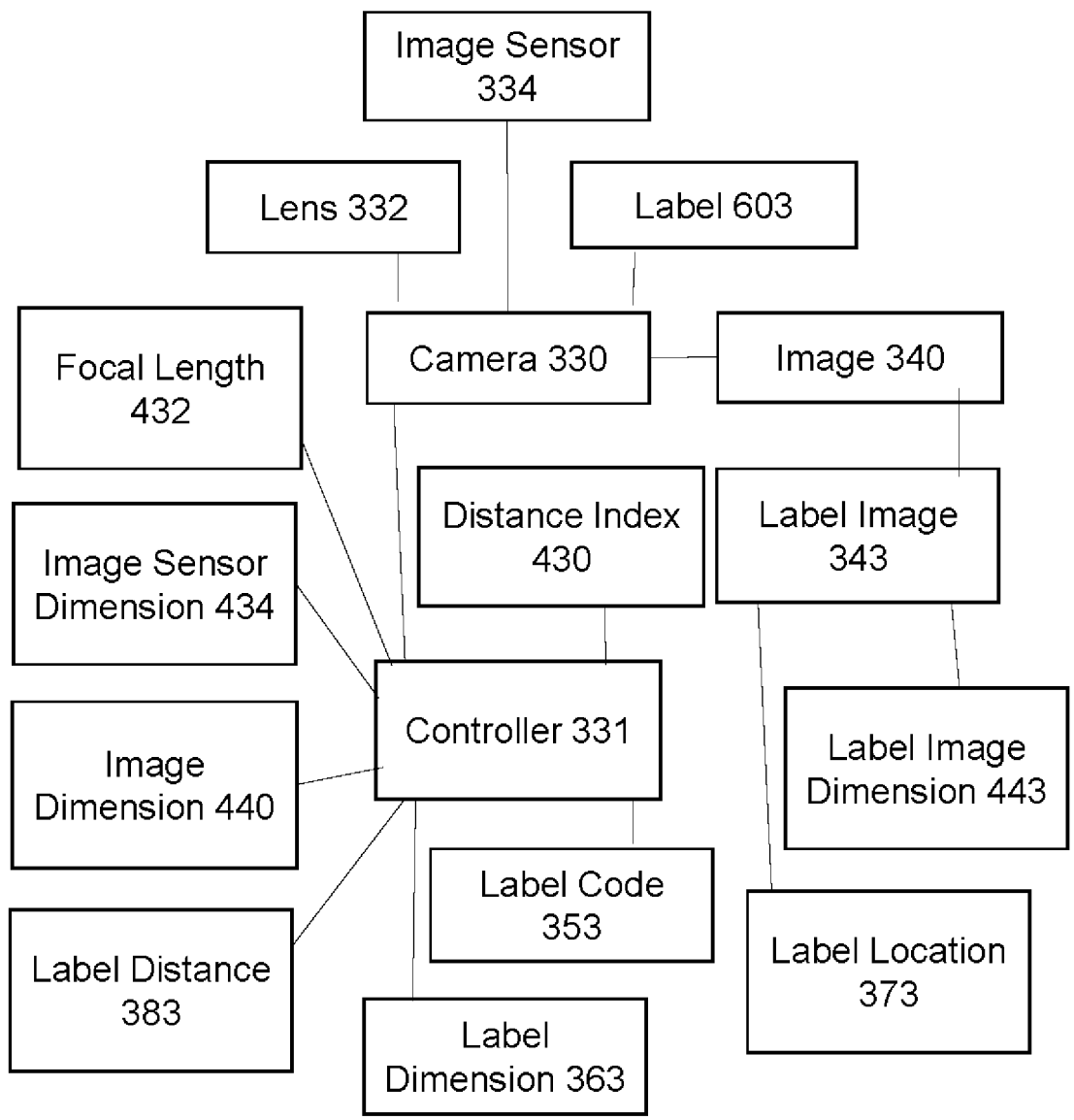
FIG. 3 illustrates an exemplary embodiment to calculate a distance of a visual label.

FIG. 3 illustrates an exemplary embodiment of calculating a distance of a label measured from a camera. In one embodiment, camera 330 captures image 340, which includes label image 343 of label 603. In one embodiment, label 603 includes a bar code, a two-dimensional bar code, a QR code, a printed label surrounded within a colored area such as a gray area, a red rectangle, a blue circle, or a yellow ellipse, a piece of characters within a colored area such as a pattern of black dots. In one embodiment, upon receiving image 340, controller 331 processes image 340 to identify label image 343. In one embodiment, label image 343 includes a bar code and controller 331 processes image 340 to identity a sequence of black vertical bars. In one embodiment, label image 343 includes a QR code and controller 331 processes image 340 to identity three black square-ish blocks and a plurality of black blocks bounded by a rectangle using the identified three black blocks. In one embodiment, label image 343 includes a colored area and controller 331 processes image 340 to identity an area of a pre-determined color and/or a pre-determined pattern. In one embodiment label image 343 includes one or more characters and controller 331 recognizes the one or more characters using an optical character recognition processing technique. In one embodiment, controller 331 applies pre-configured one or more label recognition processing techniques to process image 340 to recognize label image 343.

In one embodiment, controller 331 calculates label image dimension 443 for the size of the label image 343 while identifying label image 343. In one embodiment, label image dimension 443 is measured in number of pixels or a unit of length such as millimeter, centimeter, or inches. In one embodiment, label image 343 includes a bar code, and controller 331 calculates the width of label image dimension 443 in pixels or other unit of length, between the left most bar and the right most bar. In one embodiment, label image 343 includes a QR code, and controller 331 measures label image dimension 443 being the width and/or height of the QR code, between the left-most identified black block and the right-most black block, or between the top black block and the bottom black block. In one embodiment, label image 343 includes a colored area, and controller 331 calculates label image dimension 443 as the width and/or height between the left boundary and the right boundary of the colored area, or between the top boundary and the bottom boundary of the colored area.

In one embodiment, controller 331 determines label location 373 of label 603 in label image 343. In one embodiment, controller 331 determines label location 373 as a left most position, the top left position, a right most position, the top right position, the bottom left position, or any position of label image 343. In one embodiment, controller 331 determines label location 373 as a center location of label image 343. In one embodiment, controller 331 determines label location 373 as any location or a specific location according to a pre-determine pattern recognized from label image 343.

In one embodiment, controller 331 use x-dimension and/or y-dimension values for label image dimension 443 and/or label location 373.

In one embodiment, camera 330 includes an optical lens 332 and an image sensor 334. In one embodiment, lens 332 includes a single lens with a focal length, or two or more lens working in conjunction to achieve an equivalent focal length. In one embodiment, image sensor 334 is a sensor that detects and conveys detected information that constitutes an image. The detected information may include light waves and their variable attenuation. Commonly used image sensors include Bayer filter sensor, Foveon X3 sensor, CMOS-based image sensor, or CCD-based image sensor. In one embodiment, controller 331 includes attributes of optical lens 332 and image sensor 334, such as focal length 432 of lens 332, and image sensor dimension 434 of image sensor 334. In one embodiment, image sensor dimension 434 indicates a field of view of lens 332. In one embodiment, focal length 432 of optical lens 332 may be 4 mm, 29 mm, 35 mm, 45 mm, 80 mm, or a focal length measured in different unit length. In one embodiment, focal length 432 measures a focal length equivalent of optical lens 332. In one embodiment, image sensor dimension 434 describes an area of image sensor 334 such as 4.17 mm, 3.2 mm, or a length measured in different unit length. In one embodiment, image sensor dimension 434 includes a field of view of camera 330, which allows controller 331 to calculate the image sensor dimension 434 corresponding to an equivalent area of image sensor 334 according to the field of view. In one embodiment, image 340 is captured using a pre-determined or user configured resolution or image dimension 440. In one embodiment, image dimension 440 is 4096 pixels wide, 3K pixel, 13 M pixel (about 4K pixel by 3K pixel). In one embodiment, controller 331 calculates a distance index 430 using Equation 1:

$$A=B*(C/D) \quad (1)$$

where,
 A=distance index 430
 B=image dimension 440
 C=focal length 432
 D=image sensor dimension 434.

For example, image dimension 440 is 4032 pixels, focal length 432 is 4 mm, and image sensor dimension 434 is 4.17 mm. Distance index 430 would be calculated as 3867.63.

Distance index 430 can be used to calculate a distance of an object captured by camera 330. In one embodiment, distance index 430 is pre-determined or pre-calculated and stored in controller 331. In one embodiment, controller 331 calculates distance index 430 after determining or obtaining image dimension 440. In one embodiment, a user instructs camera 330 to capture image 340 using a resolution of image dimension 440. In one embodiment, a camera application, perhaps also being executed by controller 331, instructs camera 330 to capture image 340 using image dimension 440. In one embodiment, controller 331 receives an instruction from a network computing device and instructs camera 330 accordingly to capture image 340 using image dimension 440. In one embodiment, controller 331 includes a plurality of distance indices for a plurality of image dimensions, and selects distance index 430 upon knowing image dimension 440.

In one embodiment, controller 331 obtains image 340, having an image dimension 440, and recognizes label image 343 of label 603, as illustrated earlier in this application. Also, controller 331 determines label image dimension 443, label code 353 and label dimension 363, as a result of recognizing label image 343, as explained previously. In one embodiment, controller 331 calculates label distance 383 using Equation 2:

$$E=A*(F/G) \quad (2)$$

where,
 A=distance index 430
 E=label distance 383
 F=label dimension 363
 G=label image dimension 443.

In one embodiment, controller 331 calculates label distance 383 without using distance index 430 using Equation 3:

$$E=B*(C/D)*(F/G) \quad (3)$$

where,
 B=image dimension 440
 C=focal length 432
 D=image sensor dimension 434
 E=label distance 383
 F=label dimension 363
 G=label image dimension 443.

For example, using a previously calculated embodiment of distance index 430 being about 3867.63, label dimension 363 is 30 mm, and label image dimension 443 is 200 pixels. Label distance 383 would be calculated as about 580.1 mm or about 58 cm, which is about 23 inches or almost 2 feet. In this embodiment, label distance 383 indicates label 603 is about 23 inches or 2 feet away from camera 330.

In one example, label dimension 363 is 18 inches and label image dimension 443 is 315 pixels. Using the embodiment of distance index 430, label distance 383 is calculated to be 221.01 inches, or about 18.42 feet away from camera 330. In this example, label 603 may be a door sign such as "Exit" and object 601 may be a door. Label distance 383 indicates an Exit door is approximately 18.5 feet away from camera 330.

In one embodiment, label distance 383 indicates a distance of label 603 perpendicular to image sensor 334 of camera 330. Controller 331 may use label location 373 to calculate label distance 383. In one embodiment label location 373 is a location of label image 343 in image 340. In one embodiment, label location 373 includes a value, such as an x-dimension value, measured from the center of image 340, and label distance 383 is calculated using Equation 4:

$$E=A*F*((1/G^2)+(1/H^2))^{1/2} \quad (4)$$

where,
 A=distance index 430
 E=label distance 383
 F=label dimension 363
 G=label image dimension 443
 H=label location 373, x-dimension.

In one embodiment, label location 373 includes an x-dimension value and a y-dimension value, both measured from the center of image 340. Label distance 383 is calculated using Equation 5:

$$E=A*F*((1/G^2)+(1/H^2)+(1/I^2))^{1/2} \quad (5)$$

where,
 A=distance index 430
 E=label distance 383
 F=label dimension 363
 G=label image dimension 443
 H=label location 373, x-dimension
 I=label location 373, y-dimension.

In one embodiment, controller 331 calculates an orientation for label distance 383. In one embodiment, label location 373 indicates it is on the left of the center of image 340, and controller 331 determines the orientation is on the right side. The controller 331 determines the orientation is on the left side if label location 373 is on the right of the center of image 340. Controller 331 may determine the orientation is on the top half if label location 373 is above or below the center of image 340. Controller 331 may determine the orientation to include a "clock" direction (e.g. 2 o'clock, 4 o'clock, 9 o'clock, etc.) to indicate an angle of label location 363 relative to the center of image 340. Controller 331 may determine the orientation is "ahead" to indicate label location 373 is near the center vertical line of image 340.

In one embodiment, controller 331 does not calculate distance index 430 directly and instead uses the right hand side of Equation 1 to calculate label distance 383.

Figure 4:
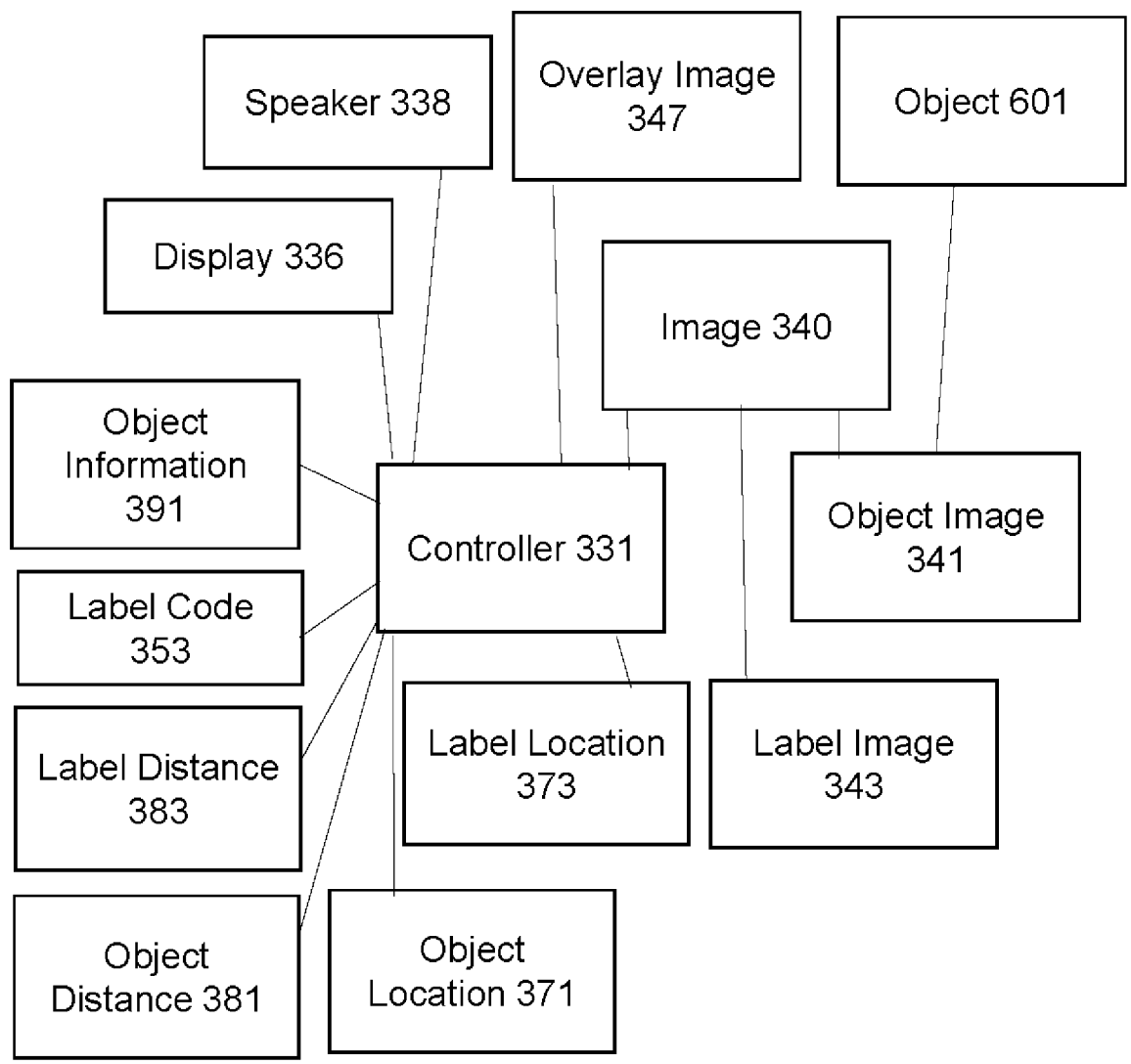
FIG. 4 illustrates an exemplary embodiment to announce information related to a visual object.

FIG. 4 illustrates an exemplary embodiment to announce object information 391 related to object 601. In this embodiment, controller 331 obtains image 340, which includes object image 341 of object 601 and label image 343. As illustrated in previously, controller 331 obtains label location 373 indicating a location of label image 343 within image 340. Controller 331 also calculates label distance 383 associated with label image 343, determines label code 353, and obtains object information 391 related to object 601 using label code 353. In one embodiment, object information 391 includes information to be used by controller 331 to recognize object 601 by recognizing object image 341. In one embodiment, object information 391 includes one or more of a dimension, a pattern, a color code, a plurality of computing instructions, and data for image recognition. Controller 331 may use object information 391 to process image 340 to recognize object image 341. Upon recognizing object image 341, controller 331 calculates object location 371 and object distance 381 using a process similar to a process to calculate label location 373 and label distance 383 as explained previously. In one embodiment, controller 331 considers object location 371 to be the same or approximately the same as label location 373, and object distance 381 to be the same or approximately the same as label distance 383.

In one embodiment, controller 331 includes a speaker 338 and announces one or more of objection information 391, object distance 381 and object location 371 over speaker 338. In one embodiment, controller 331 announces an audio signal for "Exit door is about 5 feet slightly on the left ahead", where in this embodiment "Exit door" is included in object information 391 corresponding to object 601, "5 feet" is object distance 381, and "slightly on the left ahead" indicates object location 371 being on the left but close to the center of image 340. Other embodiments may include "Van Gough painting is 100 cm at the 2 o'clock direction", "the door is 12 feet ahead", and "there is a coffee cup two feet away, and it is on your lower right". In one embodiment, object information 391 includes information to process object distance 381 and object location 371 for announcement. For example, controller 331 determines, using object information 391, that object 601 is a book located on the $3^{rd}$ shelf on a bookshelf left of the camera. In one embodiment, object information 391 includes other information related to object 601 and controller 331 announces the information. For example, controller 331 announces "the bronze sculpture 5 feet on the slight left is titled 'The Persistence of Memory' by Salvador Dali". In one embodiment, object information 391 includes an audio clip and controller 331 plays the audio clip via speaker 338.

In one embodiment, controller 331 connects to a display 336, and announces object information 391 by displaying object information 391 using display 336. In one embodiment, controller 331 generates overlay image 347 by overlaying object information 391 onto image 340. In one embodiment, controller 331 places object information 391 at or near object location 371 in overlay image 347. In one embodiment, controller 331 includes object distance 381 with overlay image 347, displaying a distance of object 601 in overlay image 347. In one embodiment, object information 391 includes a video clip, and controller 331 plays the video clip on display 336.

In one embodiment, controller 331 connects to display 336 and speaker 338, and announces object information 391 and/or object distance 381 to both display 336 and speaker 338.

In one embodiment, controller 331 determines object distance 381 exceeds a pre-determined distance and does not announce object information 391. In one embodiment, controller 331 determines object distance 381 is within a pre-determined distance and announces object information 391. In one embodiment, controller 331 does not announce object information 391 if object distance 381 is within a pre-determined distance range.

In one embodiment, object distance 381 includes an orientation (e.g. a "clock" direction) and is outside an orientation range, and controller 331 does not announce object information 391. In one embodiment, controller 331 announces object information 391 when object distance 381 is within an orientation range.

Figure 5:
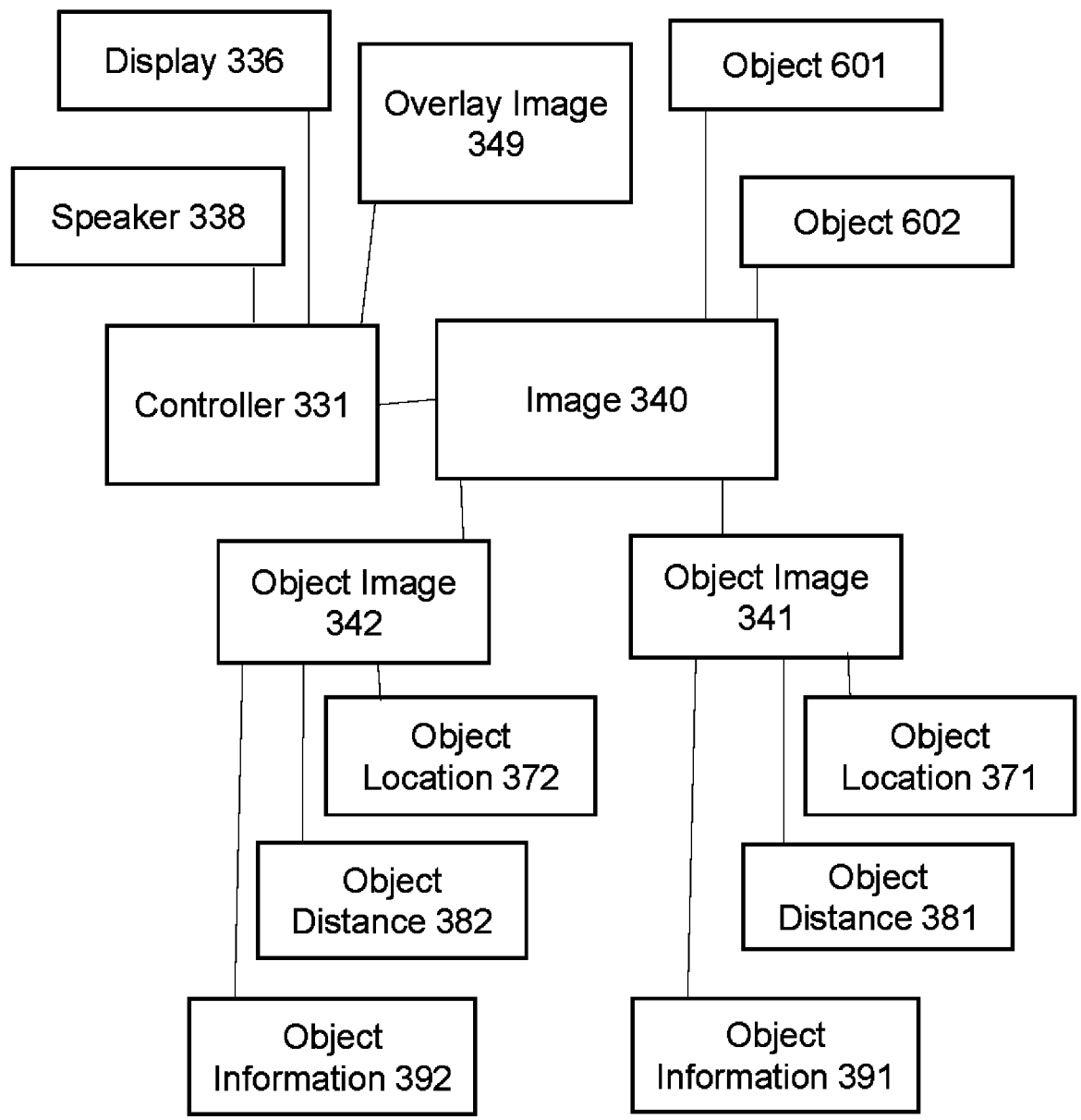
FIG. 5 illustrates an exemplary embodiment to present overlaid information between two visual objects.

FIG. 5 illustrates an exemplary embodiment to announce object information between two recognized visual objects. In one embodiment, controller 331 receives image 340 containing object image 341 and object image 342 corresponding to object 601 and object 602 respectively. Controller 331 determines for object 601, using object image 341 as previously explained, object location 371, object distance 381 and object information 391. Similarly, controller 331 determines for object 602, using object image 342, object location 372, object distance 382 and object information 392. In one embodiment, controller 331 announces object information 391 via the display 336. In one embodiment, controller 331 determines object distance 381 is smaller than object distance 382, indicating object 601 is closer than object 602. In one embodiment, controller 331 creates overlay image 349 by overlaying object information 391 into image 340. Controller 331 overlays object information 391 with a suggestion that object 601 is closer than object 602. In one embodiment, controller 331 overlays object information 391 over object image 342 such that part of object image 342 is covered and not displayed in overlay image 349. In one embodiment, controller 331 also announces object information 392 in overlay image 349. In one embodiment, controller 331 uses a smaller text font in presenting object information 392 than that of object information 391, so that object information 392 appears farther away from object information 391, suggesting that object distance 381 is shorter than object distance 382.

In one embodiment, controller 331 announces object information 391 and object information 392 via speaker 338. In one embodiment, controller 331 announces object information 391 and object information 392 based on a sorted order of object distance 381 and object distance 382. In one embodiment, controller 331 announces object information 391 before object information 392 as object distance 381 is shorter than object distance 382. In another embodiment, controller 331 announces object information 392 for the longer object distance 382 before object information 391 for the shorter object distance 381.

In one embodiment, controller 331 determines object distance 382 exceeds a pre-determined distance or object distance 382 is outside a pre-determined orientation range, and does not announce object information 392. In one embodiment, controller 331 determines object distance 382 is within a pre-determined distance or within an orientation range and announces object information 392.

Figure 6:
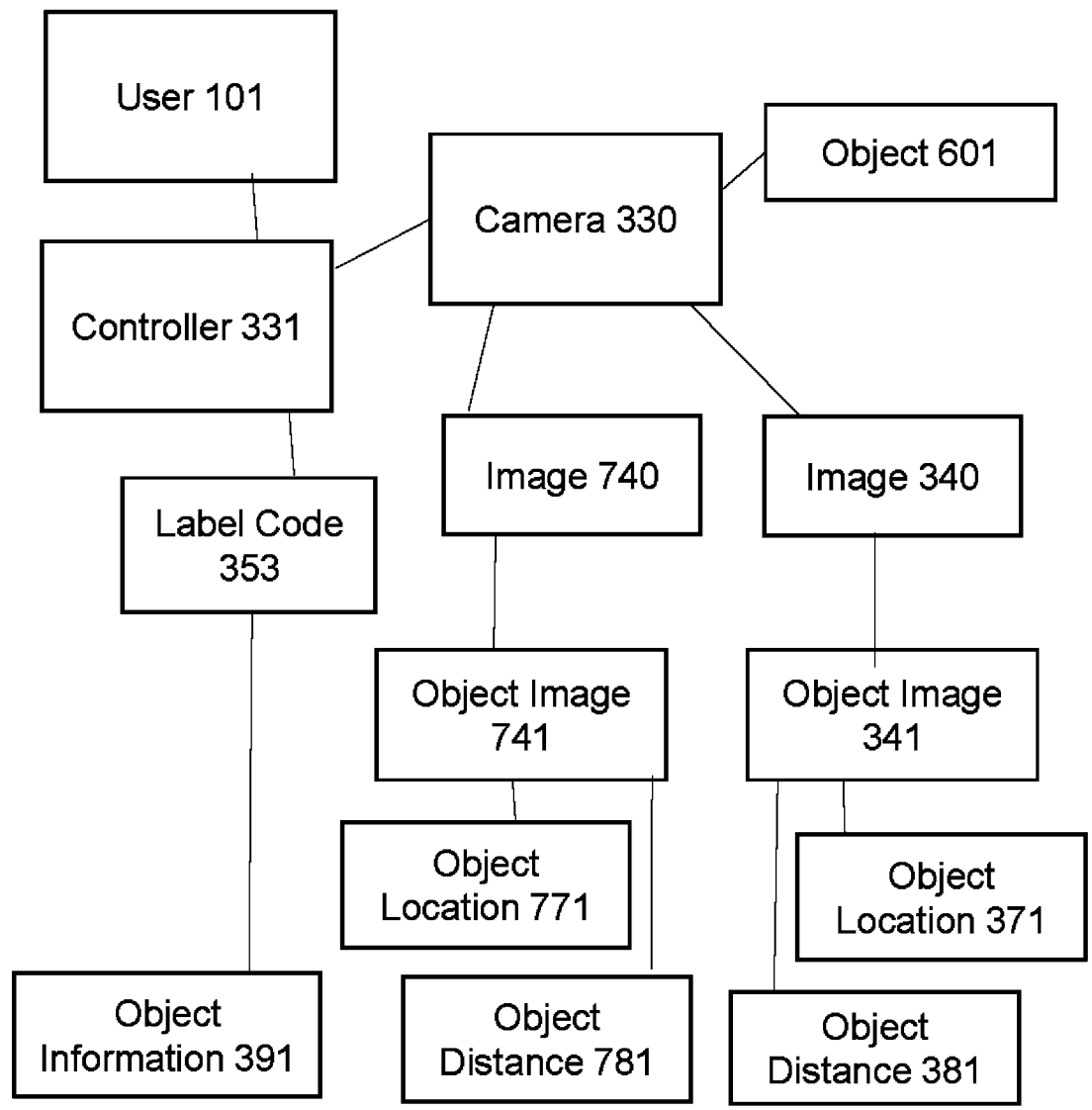
FIG. 6 illustrates an exemplary embodiment of continuously presenting a visual object.

FIG. 6 illustrates an exemplary embodiment of continuously presenting a recognized visual object. In one embodiment, camera 330 captures image 340 and image 740 of object 601 at different times. In one embodiment, user 101 moves from one location to another location, and camera 330 captures the two images from the two locations. In one embodiment, controller 331 instructs or configures camera 330 to capture images according to a time schedule, such as 30 images per second, one image per second or one image every 10 seconds, according to a change of event such as a change of location, or according to a received command from user 101 or from a network computer.

In one embodiment, image 340 includes object image 341 of object 601. Controller 331 determines label code 353 of object 601 as illustrated previously. Controller 331 also determines object location 371, object distance 381 and object information 391 using label code 353 and image 340. Upon receiving image 740, controller 331 determines label code 353 in image 740 to be the same label code 353 in image 340. In one embodiment, controller 331 calculates object location 771, object distance 781 of object image 741 using label code 353 and image 740 in the same manner as illustrated above.

In one embodiment, controller 331 obtains object information 391 using label code 353, as illustrated above. In one embodiment, controller 331 announces object information 391 after processing image 340, using object location 371 and object distance 381. In one embodiment, controller 331 announces object information 391 after processing image 740, using object location 771 and object distance 781. In one embodiment, controller 331 announces an indication that object 601 has changed location. In one embodiment, controller 331 plays an audio signal, such as "the coffee cup has moved to <object location 771>", "the Teddy Bear toy has moved from the left to the right", "the Exit door is now at <object location 771, object distance 781>", or "the Exit door is now out of range".

In one embodiment, controller 331 processes image 340 to recognize label code 353 for object 601, as illustrated above. Upon receiving image 740, controller 331 processes image 740 to recognize label code 353 in a similar manner. In one embodiment, controller 331 does not recognize label code 353 in image 740, and controller 331 may announce to user 101 that object 601 is not present in image 740. For example, controller 331 may announce "you cannot see the cup", "the basketball is out of sight now", or "I do not see the cereal box".

Figure 7:
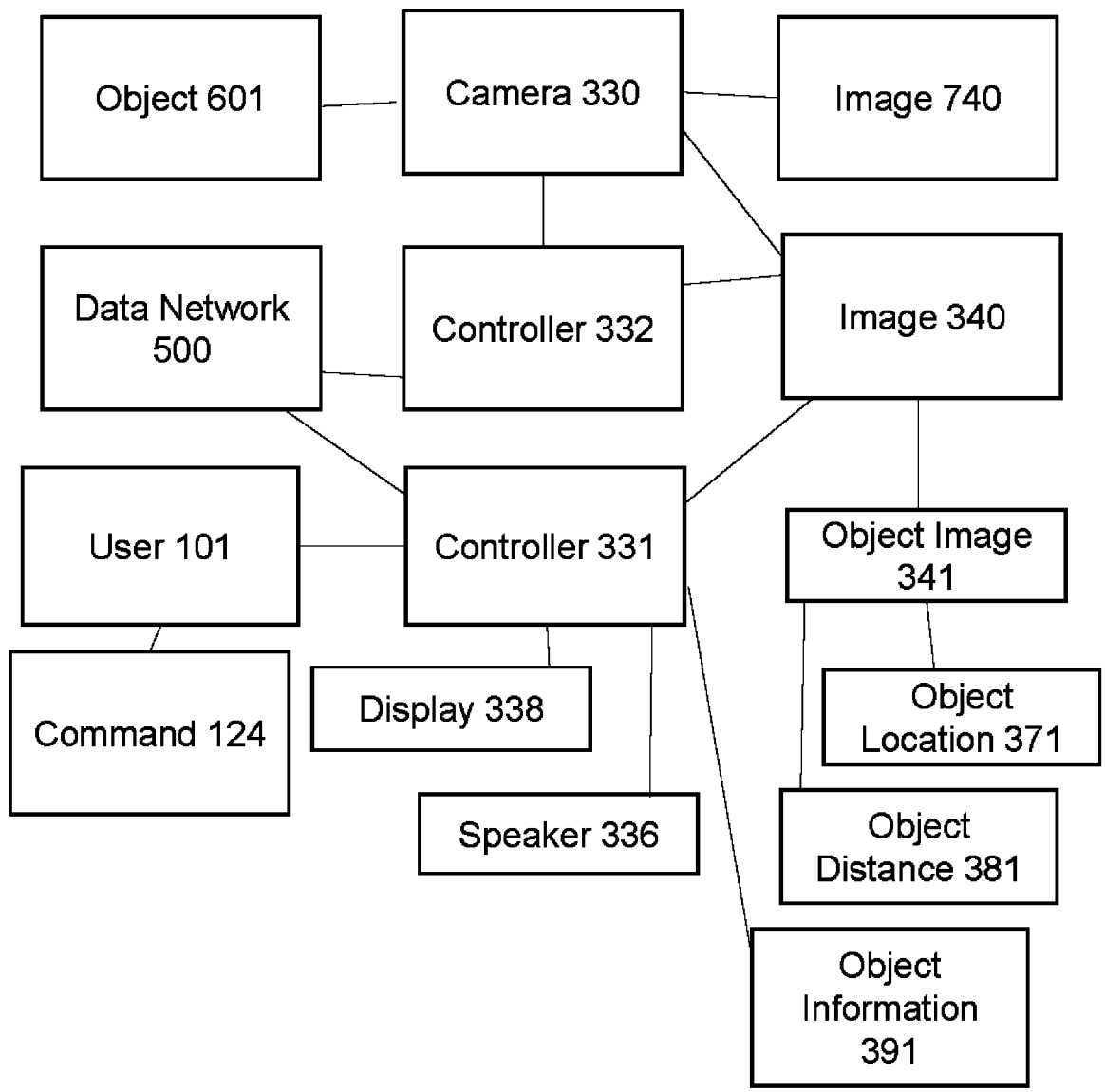
FIG. 7 illustrates an exemplary embodiment of presenting a visual object in a remote environment.

FIG. 7 illustrates an exemplary embodiment of announcing a recognized visual object seen from a remote camera. In one embodiment camera 330 is connected to a controller 332, which in turns connects to controller 331 over a data network 500, which may include a home data network, a company data network, a data center network, the Internet, or a cloud data network. In one embodiment, camera 330 captures an image 340 of object 601. Controller 332 sends image 340 to controller 331 over data network 500. In one embodiment, controller 332 may be included in a robot, a flying drone, a remote-controlled vehicle, a remote-controlled toy car, a robot, a HMD worn on a guide dog or a rescue dog, goggles, or a wearable device. Upon receiving image 340, in one embodiment, controller 331 recognizes object image 341 and calculates object location 371 and object distance 381 using image 340 and object image 341, as illustrated previously. In one embodiment, controller 331 also obtains object information 391 and announces object information 391 via display 338 and/or speaker 336 connected to controller 331. In one embodiment, upon reviewing image 340 or receiving announcement of object information 391, user 101 inputs a command 124 to controller 331 to instruct controller 332 to operate camera 330. In one embodiment, command 124 includes a navigation command such as turn left, rotate right, move forward, back up at a pre-determined speed, fly forward, dive, or move upward. In one embodiment, command 124 includes a capturing command such as take a picture, activate flash light, start/stop recording, change image resolution, adjust focal length, activate night vision, or other capturing command. In one embodiment, command 124 includes a command for controller 332 such as raise a robot arm, increase/decrease speed/rotation, or turn a knob, which indirectly controls camera 330. Controller 331 sends command 124 to controller 332. In one embodiment, controller 332 receives command 124 and applies command 124 to operate camera 330. In one embodiment, after applying command 124, controller 332 instructs camera 330 to capture image 740, and sends image 740 to controller 331 for processing.

In one embodiment, this invention can be used by a vision-impaired user, in a virtual reality environment, to control a remote machine such as a drone or a remote-controlled car, a guide dog wearing a controller-assist camera, in an augmented reality environment, in a dark environment using a controller-assist night-vision camera, in a warehouse. In one embodiment, the controller connects to or also executes a software application, and sends one or more of label distance, label location, label code, object distance, object location, and object information to the software application for further processing.

The present invention can take the form of an entirely hardware embodiment, an entirely software embodiment or an embodiment containing both hardware and software elements. In a preferred embodiment, the present invention is implemented in software, which includes but is not limited to firmware, resident software, microcode, etc.

Furthermore, the present invention can take the form of a computer program product accessible from a computer usable or computer readable storage medium providing program code for use by or in connection with a computer or any instruction execution system. For the purposes of this description, a computer usable or computer readable storage medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk.

Current examples of optical disks include compact disk-read only memory (CD-ROM), compact disk-read/write (CD-R/W) and DVD. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, point devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified local function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for determining a distance and an orientation of an object captured by a camera, comprising:
   (a) receiving, by a controller of a computing device, an image of the object and a label associated with the object, the image captured by the camera coupled to the controller;
   (b) identifying a label image of the label in the image by the controller;
   (c) determining a label dimension of the label by the controller, the label dimension comprising a real world size of the label;
   (d) determining a label image dimension of the label image by the controller, the label image dimension comprising a size of the label image;
   (e) determining a set of optical characteristics of the camera by the controller;
   (f) calculating, by the controller, a label distance using the set of optical characteristics of the camera, the label dimension, and the label image dimension;
   (g) calculating, by the controller, a label orientation based on a label location and the label distance, the label location comprising a position of the label image in the image;
   (h) announcing the label orientation using at least one output component coupled to the controller and displaying an overlay image comprising object information associated with the object on the image.

2. The method of claim 1, wherein the image further comprises an object image of the object, wherein the method further comprises:
   (i) obtaining the object information associated with the object;
   (j) determining an object distance using the label distance, and an object orientation using the label orientation; and
   (k) announcing one or more of the following consisting of: the object distance; the object information; and the object orientation.

3. The method of claim 2, wherein the announcing (k) comprises:
   (k1) determining whether the object distance is within a distance range;
   (k2) in response to determining that the object distance is within the distance range, announcing the one or more of the following consisting of: the object distance; the object information; and the object orientation; and
   (k3) in response to determining that the object distance orientation not within the distance range, not announcing the object distance, the object information, or the object orientation.

4. The method of claim 2, wherein the announcing (k) comprises:
   (k1) determining whether the object orientation is outside of an orientation range;
   (k2) in response to determining that the object orientation is not outside of the orientation range, announcing the one or more of the following consisting of: the object distance; the object information; and the object orientation; and
   (k3) in response to determining that the object orientation is outside of the orientation range, not announcing the object distance, the object information, or the object orientation.

5. The method of claim 1, wherein the camera is connected to the controller over a data network.

6. The method of claim 5, further comprising:
(i) sending, by the controller to the camera, a command to move the camera over the data network; and
(j) sending, by the controller to the camera, a command to capture a second image of the object over the data network.

7. The method of claim 1, wherein the at least one output component comprises a speaker of a wearable device, wherein the announcing (h) comprises:
(h1) playing audio signals for the label orientation on the speaker of the wearable device.

8. The method of claim 1, further comprising:
(i) receiving, by the controller, a second image of the object and a second label associated with the object, the second image captured by the camera coupled to the controller;
(j) identifying a second label image of the second label in the second image by the controller;
(k) determining a second label dimension of the second label by the controller, the second label dimension comprising a real world size of the second label;
(l) determining a second label image dimension of the second label image by the controller, the second label image dimension comprising a size of the second label image;
(m) calculating, by the controller, a second label distance using the set of optical characteristics of the camera, the second label dimension, and the second label image dimension;
(n) calculating, by the controller, a second label orientation based on a second label location and the second label distance, the second label location comprising a position of the second label image in the second image;
(o) determining, by the controller, that the second label image matches the label image; and
(p) in response to determining that the second label image matches the label image, announcing that the object has changed locations and announcing the second label orientation using at least one output component coupled to the controller.

9. A method for determining a distance and an orientation of an object captured by a camera, comprising:
(a) receiving, by a controller of a computing device, an image of the object and a label associated with the object, the image captured by the camera coupled to the controller;
(b) identifying a label image of the label in the image by the controller;
(c) determining a label dimension of the label by the controller, the label dimension comprising a real world size of the label;
(d) determining a label image dimension of the label image by the controller, the label image dimension comprising a size of the label image;
(e) determining a set of optical characteristics of the camera by the controller;
(f) calculating, by the controller, a label distance using the set of optical characteristics of the camera, the label dimension, and the label image dimension;
(g) calculating, by the controller, a label orientation based on a label location and the label distance, the label location comprising a position of the label image in the image;
(h) announcing the label orientation using at least one output component coupled to the controller, wherein the at least one output component comprises a display of a wearable device, wherein the announcing (h) comprises:
(h1) displaying the label orientation on the display of the wearable device.

10. A non-transitory computer readable medium comprising computer readable program code embodied therein for determining a distance and an orientation of an object captured by a camera, wherein when executed by one or more processors causes the one or more processors to:
(a) receive an image of the object and a label associated with the object, the image captured by the camera;
(b) identify a label image of the label in the image;
(c) determine a label dimension of the label, the label dimension comprising a real world size of the label;
(d) determine a label image dimension of the label image, the label image dimension comprising a size of the label image;
(e) determine a set of optical characteristics of the camera;
(f) calculate a label distance using the set of optical characteristics of the camera, the label dimension, and the label image dimension;
(g) calculate a label orientation based on a label location and the label distance, the label location comprising a position of the label image in the image; and
(h) announce the label orientation using at least one output component and display an overlay image comprising object information associated with the object on the image.

11. The medium of claim 10, wherein the image further comprises an object image of the object, wherein the one or more processors are further caused to:
(i) obtain the object information associated with the object;
(j) determine an object distance using the label distance, and an object orientation using the label orientation; and
(k) announce one or more of the following consisting of: the object distance; the object information; and the object orientation.

12. The medium of claim 11, wherein the announce (k) comprises:
(k1) determine whether the object distance is within a distance range;
(k2) in response to determining that the object distance is within the distance range, announce the one or more of the following consisting of: the object distance; the object information; and the object orientation; and
(k3) in response to determining that the object distance orientation not within the distance range, not announce the object distance, the object information, or the object orientation.

13. The medium of claim 11, wherein the announce (k) comprises:
(k1) determine whether the object orientation is outside of an orientation range;
(k2) in response to determining that the object orientation is not outside of the orientation range, announce the one or more of the following consisting of: the object distance; the object information; and the object orientation; and
(k3) in response to determining that the object orientation is outside of the orientation range, not announce the object distance, the object information, or the object orientation.

14. The medium of claim 10, wherein the camera is connected to the one or more processors over a data network.

15. The medium of claim 14, further comprising:
(i) send to the camera a command to move the camera over the data network; and
(j) send to the camera a command to capture a second image of the object over the data network.

16. The medium of claim 10, wherein the at least one output component comprises a speaker of a wearable device, wherein the announce (h) comprises:
(h1) play audio signals for the label orientation on the speaker of the wearable device.

17. A non-transitory computer readable medium comprising computer readable program code embodied therein for determining a distance and an orientation of an object captured by a camera, wherein when executed by one or more processors causes the one or more processors to:
(a) receive an image of the object and a label associated with the object, the image captured by the camera coupled to the controller;
(b) identify a label image of the label in the image by the controller;
(c) determine a label dimension of the label by the controller, the label dimension comprising a real world size of the label;
(d) determine a label image dimension of the label image by the controller, the label image dimension comprising a size of the label image;
(e) determine a set of optical characteristics of the camera by the controller;
(f) calculate a label distance using the set of optical characteristics of the camera, the label dimension, and the label image dimension;
(g) calculate a label orientation based on a label location and the label distance, the label location comprising a position of the label image in the image;
(h) announce the label orientation using at least one output component coupled to the controller, wherein the at least one output component comprises a display of a wearable device, wherein the announce (h) comprises:
(h1) display the label orientation on the display of the wearable device.

18. A system, comprising:
a camera; and
a computer readable medium comprising computer readable program code embodied therein for determining a distance and an orientation of an object captured by the camera, wherein when executed by one or more processors causes the one or more processors to:
(a) receive an image of the object and a label associated with the object, the image captured by the camera;
(b) identify a label image of the label in the image;
(c) determine a label dimension of the label, the label dimension comprising a real world size of the label;
(d) determine a label image dimension of the label image, the label image dimension comprising a size of the label image;
(e) determine a set of optical characteristics of the camera;
(f) calculate a label distance using the set of optical characteristics of the camera, the label dimension, and the label image dimension;
(g) calculate a label orientation based on a label location and the label distance, the label location comprising a position of the label image in the image; and
(h) announce the label orientation using at least one output component and display an overlay image comprising object information associated with the object on the image.

19. The system of claim 18, wherein the calculate (g) comprises:
(g1) determine the label orientation as an angle based on the label distance and the label location relative to a predetermined location in the image.

20. The system of claim 19, wherein the announce (k) comprises:
(k1) determine whether the object distance is within a distance range;
(k2) in response to determining that the object distance is within the distance range, announce the one or more of the following consisting of: the object distance; the object information; and the object orientation; and
(k3) in response to determining that the object distance orientation not within the distance range, not announce the object distance, the object information, or the object orientation.

21. The system of claim 19, wherein the camera is connected to the one or more processors over a data network.

22. The system of claim 21, further comprising:
(i) send to the camera a command to move the camera over the data network; and
(j) send to the camera a command to capture a second image of the object over the data network.

23. The system of claim 18, wherein the image further comprises an object image of the object, wherein the one or more processors are further caused to:
(i) obtain the object information associated with the object;
(j) determine an object distance using the label distance, and an object orientation using the label orientation; and
(k) announce one or more of the following consisting of: the object distance; the object information; and the object orientation.

24. The system of claim 23, wherein the announce (k) comprises:
(k1) determine whether the object orientation is outside of an orientation range;
(k2) in response to determining that the object orientation is not outside of the orientation range, announce the one or more of the following consisting of: the object distance; the object information; and the object orientation; and
(k3) in response to determining that the object orientation is outside of the orientation range, not announce the object distance, the object information, or the object orientation.

25. The system of claim 18, wherein the at least one output component comprises a speaker of a wearable device, wherein the announce (h) comprises:
(h1) play audio signals for the label orientation on the speaker of the wearable device.

26. A system, comprising:
a camera; and
a computer readable medium comprising computer readable program code embodied therein for determining a distance and an orientation of an object captured by the camera, wherein when executed by one or more processors causes the one or more processors to:
(a) receive an image of the object and a label associated with the object, the image captured by the camera coupled to the controller;
(b) identify a label image of the label in the image by the controller;
(c) determine a label dimension of the label by the controller, the label dimension comprising a real world size of the label;
(d) determine a label image dimension of the label image by the controller, the label image dimension comprising a size of the label image;
(e) determine a set of optical characteristics of the camera by the controller;
(f) calculate a label distance using the set of optical characteristics of the camera, the label dimension, and the label image dimension;
(g) calculate a label orientation based on a label location and the label distance, the label location comprising a position of the label image in the image;
(h) announce the label orientation using at least one output component coupled to the controller, wherein the at least one output component comprises a display of a wearable device, wherein the announce (h) comprises:
(h1) display the label orientation on the display of the wearable device.

* * * * *